(12) United States Patent
Chen et al.

(10) Patent No.: US 9,798,803 B2
(45) Date of Patent: Oct. 24, 2017

(54) SECURITY SYSTEM OPERATOR EFFICIENCY

(71) Applicant: Honeywell International Inc., Morristown, NJ (US)

(72) Inventors: Henry Chen, Beijing (CN); Michelle Raymond, St. Louis Park, MN (US); Vit Libal, Prague (CZ); Jan Jelinek, Plymouth, MN (US); Valerie Guralnik, Mound, MN (US)

(73) Assignee: Honeywell International Inc., Morris Plains, NJ (US)

( * ) Notice: Subject to any disclaimer, the term of this patent is extended or adjusted under 35 U.S.C. 154(b) by 784 days.

(21) Appl. No.: 14/013,813

(22) Filed: Aug. 29, 2013

(65) Prior Publication Data

US 2015/0066903 A1   Mar. 5, 2015

(51) Int. Cl.
*G06F 17/30* (2006.01)
*G08B 13/196* (2006.01)

(52) U.S. Cl.
CPC .... *G06F 17/30734* (2013.01); *G06F 17/3079* (2013.01); *G06F 17/30793* (2013.01); *G06F 17/30811* (2013.01); *G08B 13/1968* (2013.01); *G08B 13/19615* (2013.01); *G08B 13/19682* (2013.01)

(58) Field of Classification Search
CPC ........................ G06F 17/3079; G06F 17/30793
See application file for complete search history.

(56) References Cited

U.S. PATENT DOCUMENTS

| | | | | |
|---|---|---|---|---|
| 2006/0268108 A1* | 11/2006 | Abraham | ........... | G08B 13/1968 348/143 |
| 2007/0008408 A1* | 1/2007 | Zehavi | ............. | G08B 13/19613 348/143 |
| 2007/0268121 A1* | 11/2007 | Vasefi | .................... | G06Q 10/06 340/506 |
| 2010/0138755 A1* | 6/2010 | Kulkarni | ................. | G06F 21/33 715/757 |
| 2012/0310916 A1* | 12/2012 | Abadi | ............... | G06F 17/30445 707/713 |
| 2015/0081579 A1* | 3/2015 | Brown | ................. | G06Q 50/265 705/325 |

* cited by examiner

*Primary Examiner* — Aleksandr Kerzhner
*Assistant Examiner* — Michael K Tamaru
(74) *Attorney, Agent, or Firm* — Schwegman, Lundberg & Woessner, P.A.

(57) ABSTRACT

Systems and methods for increasing an efficiency of an operator of a security system are discussed generally herein. A system can include a memory including ontology data saved thereon, the ontology data can define interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, the security policy includes a response an operator can perform if the conditions are satisfied, and the system can include a query module configured to receive a query and search the ontology data and temporal and spatial data associated with the area under surveillance in response to receiving the query.

11 Claims, 4 Drawing Sheets

SECURITY SYSTEM OPERATOR EFFICIENCY

BACKGROUND

Prior attempts at systems and methods for system security can include an operator analyzing a large amount of security related data, such as events logged by one or more subsystems (e.g., access control system, intrusion detection system, perimeter protection system, Closed-Circuit Television (CCTV), etc.). Such systems can have an operator make a number of decisions in a short amount of time.

SUMMARY

In one or more embodiments, a system can include a memory including ontology data stored thereon, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied. The system can also include a query module, executable by a processor, configured to receive a query and search the ontology data and temporal and spatial data associated with the area under surveillance in response to receiving the query.

In one or more embodiments, a method can include receiving, at a query module, a query and in response to receiving the query, searching ontology data as a function of the query, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied. The method can also include returning a result as a function of the ontology data.

In one or more embodiments a computer readable storage device can include code to cause a computer to perform the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the disclosure, and it is to be understood that other embodiments may be utilized and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, Application-Specific Integrated Circuit (ASIC), microprocessor, or other type of processor operating on a computer system, such as a personal computer, server or other computer system.

An operator's efficiency in establishing and maintaining situational awareness can be an important factor for maintaining security in a security system (e.g., an integrated security system or an area under surveillance). The operator can analyze a large amount of security related data, such as events logged by one or more subsystems (e.g. access control system, intrusion detection system, perimeter protection system, CCTV etc.). The operator may be asked to cast a number of decisions in a short amount of time. The decision can be made based on the analyzed security data and the operator's knowledge of the area under surveillance. In such systems, the operator can be trained so as to retain a relatively large amount of knowledge about a particular security system or about security systems in general.

The knowledge needed for maintaining the security of an area under surveillance can be organized in a list of security policies that define, for a given security threat, procedures the operator should follow in response to the threat. It can be difficult, if not impossible, for a human operator to remember all the security policies and act fast and accurately when it comes to resolving a security threat.

In various embodiments, methods and systems (e.g., interactive systems) can maintain the knowledge of the security policies in an ontology. The methods and systems can interact with a user by providing status information in an appropriate context. The status information can be provided using Building Information Modeling (BIM) spatial awareness tools, or other appropriate tools for providing the status information. Status information can include status of areas or assets within an area under surveillance. For example status information can indicate that an asset is in a specific location, include live or past camera recordings (e.g., image captures), camera coverage area, camera lens parameters, scanner status (e.g., operable or inoperable), or the like. A user can be prompted with steps to accomplish as a function of one or more selected security policies. The security policies can be selected for an actual or potential security threat or security situation.

The systems and methods introduce an ontology approach to model a security system (e.g., an integrated security system that integrates one or more of an access control system, video surveillance camera system, or a perimeter protection system, etc.). For example, a transponder (e.g., a Radio Frequency IDentification (RFID) card or a proximity card), biometric data (e.g., fingerprint, retinal scan, facial topography, etc.), or other identifier can be assigned to a person or an object. The area under surveillance (e.g., one or more buildings, outside areas, inside rooms or spaces, or combinations thereof) can include one or more scanners (e.g., identifier readers, such as an RFID reader, a proximity card reader, a retina scanner, a fingerprint scanner, etc.) in communication with an access control system. Each scanner can be associated with a space in the area under surveillance, and the scanner can be associated with one or more points of access. Scan records can be recorded in the access control system and correlated with a set of policies associated with or saved in the access control system. An example of an access control system is the Enterprise Buildings Integrator™ (EBI) from Honeywell International, Inc. of Morristown, N.J.).

A floor plan of the area under surveillance can be available for viewing. The floor plan can include one or more icons overlaid thereon. Examples of icons can include icons representative of a camera having its location or coverage area (e.g., field of view) on the floor plan, a door, a scanner and optionally its corresponding coverage area, an identifier icon indicating that an entity or object with an identifier is in the space on the floor plan, etc. With such a configuration, ontology instances can be generated for a given surveillance area and its corresponding security system. The ontology and its individuals can be represented as Resource Description Framework (RDF) storage. Data in an RDF format generally provides a framework for expressing knowledge in a decentralized world. It allows a user to model knowledge and to mesh distributed knowledge sources. How to efficiently query the RDF data is well researched, and SPARQL (SPARQL Protocol and RDF Query Language) is the current World Wide Web Consortium (W3C) recommendation for querying RDF data. An example of a SPARQL query configured to determine where an asset named "MN10-PEAS1" is located in an area under surveillance can be submitted as follows:

```
select ?asset ?space
where { ?asset if c2_x4_rc4:hasIdentification
   "MN10-PEAS1"^^xsd:string.
       ?asset if C2x4_rc4:hasLocation ?space. }
```

Similarly, SPARQL can be used to query whether an identifier has been detected in the surveillance area (e.g., area under surveillance). A report can be generated, such as by using SPARQL. The report can be for a surveillance area for a specified time range, or some other specified report supported by the ontology and the SPARQL. A report can be generated, such as by using SPARQL, to identify a past or future movement path of an identifier in the surveillance area.

A security policy can be stored in the ontology in terms of security threats or security responses. A security threat can be defined as a set of one or more conditions that, when satisfied, indicate a security threat in the area under surveillance. A security response can define how an operator or computer should respond to the security threat. Security sensor data or one or more decision making algorithms can be used to detect whether the conditions are met. Security sensor data can include RFID scan read data, camera image captures, motion sensor data, or the like. The system can provide appropriate security responses to an operator as a function of the security response associated with the security threat or situation. These responses can be a sequence of SPARQL queries defined in advance according to different security policies or the different security threats. The results of the SPARQL queries can be presented to an operator. The results can be presented to the operator with one or more instructions indicating how the operator should respond to the security threat (e.g., "call 911", "follow identifier X on camera Y", "go to location Z and view the situation", or the like). Security response steps may be generated for display, and provide information to intuitively inform the operator how to perform steps that comply with the security policy. Such steps may also be listed and overlaid above a floor plan display.

For example, in a security policy corresponding to an "Asset Missing", the response can be to query for where the asset went missing from, and to get the scanner data for scanners in or near the space where the asset went missing from. Then all of the scans of the identifiers scanned in that area in a specific time window can be retrieved.

The operator can interact with the system using an interactive interface that offers information in a proper context. The proper context can include an ontology for a particular security threat and can provide spatial information (e.g., the floor plan with or without icons overlaid thereon) displayed in a geo spatial interface. The floor plan can be a vector floor plan that allows a user to zoom in/out or pan (e.g., move or rotate a perspective view left, right, up, down, or a combination thereof). A camera and its coverage area, a scanner, door, asset, identifier, historical path of the identifier, or predicted future path of the identifier can be displayed as one or more icons on the floor plan. The interface can provide a user the ability to show or hide an asset, object, entity, or other icon on a floor plan or other map. A user can specify that a specific event or series of movements be displayed on the user interface, such as by showing icons on the floor plan.

A user can modify what is shown in the user interface by setting a time period so as to adjust what information is displayed. For example, a user can specify a time period and all or a subset of events that occurred in the surveillance area in that time period can be displayed on the user interface. The user can choose to have the system repeat a sequence of events that occurred. The events can include numbers displayed on or near them to indicate the order in which the events occurred. The system can be configured to display a series of animations to simulate a sequence of events recorded in the relational database. The system can be configured to associate one or more camera-captured events with data recorded in a relational database. The data can be parsed out, such that behaviors of different persons in the ontology can be compared. Such comparisons can help identify suspects or threats.

A procedure associated with a security threat and defined in the security policies can be bound with the floor plan so as to display the result of the procedure. Access events (e.g., scans of an identifier by a scanner, camera detections of an object, or other sensor detection of an identifier) can be put in sequential order and shown in the floor plan, such as by including an index number by the event on the floor plan. A projected path for the identifier can be calculated for a specific identifier. Camera displays with a view that intersects with the projected path can be displayed to an operator.

A user can create a new security policy or use the security system information to customize the generic ontology models into resulting ontology models specific for the particular security system.

In the example of an "Asset Missing" security policy, if an asset is detected as missing it can be determined how the asset went missing (e.g., by whom and along which path) and then relevant asset, identifier, or live video history can be retrieved.

To accomplish this task, the space or room where asset should be can be determined. The identification scanner for that room or space can be determined (if there is one) or an identification scanner that is required to be passed in order to access the room or space can be determined. If there is a relevant identification scanner then the identifiers scanned by that scanner in a specific time period (e.g., between time t1 and t2) can be determined. Other scanners that have scanned the identifiers that were scanned in the specific time period can be determined. These scanners may have scanned the identifier before or after the scanner associated with the room or space scanned the identifier. In this manner, a forward or backward path of one or more identifiers can be determined. One or more embodiments can determine if one or more cameras include a field of view that intersects the forward or backward path. The video data that a camera captured in the relevant time can be retrieved. Any of these functions can be completed automatically (e.g., without human intervention) through a processor querying an ontology.

One or more embodiments can be implemented using a WSO2 (formerly Web Services Oxygen (O2)) or other platform. An ontology (relationship of room or space, identifier, personal identity, scanner, camera, access log, sensors, or the like) can be stored as RDF. The RDF data can be stored in an OpenRDF or other framework. The camera or other sensor, its location, and its coverage area can be stored in a relational database, such as a MySQL database. The space (e.g., a room or other area in the area under surveillance) its boundaries, its door, and the scanner to allow a user to enter or exit the space via a door can be stored in the relational database.

Scalable Vector Graphic (SVG) software, or other vector graphics software, can be used to show a vector image of the floor plan of the area under surveillance. An eXtensible Stylesheet Language (XSL), or other conversion language, can be used to convert a SPARQL request (e.g., a SPARQL eXtensible Markup Language (XML) request) to the proper relational database format. A Cascading Style Sheet (CSS) language, or other image formatting language, can be used to format and display result on a display.

An example of SPARQL code configured to query for security response procedure of the "Asset Missing" security policy is provided:

```
#Get location (Space) of Asset
SELECT ?space ?name ?description
WHERE { LET (?id := "MN10-PEAS1") .
    ?asset ifc2x4_rc4:hasIdentification ?id .
    ?asset ifc2x4_rc4:hasLocation ?space .
    BIND(smf:name(?space) AS ?name) .
    ?space core:hasDescription ?description .}
#Get ProximityReader for Space
SELECT ?reader ?ebiPoint
WHERE { LET (?space := core:getLocationOfAsset("MN10-PEAS1")) .
    ?reader security:opensSpace ?space.
    ?ebiPoint core:forSensor ?reader .}
#Get AccessReportItem for EBIPoint in time range
SELECT ?read ?dateTime ?cardHolderFirstName ?cardHolderLastName
?conditionName ?spaceName ?spaceDescription ?cardNumber
WHERE { LET (?ebiPointName :=
"USMN10-MN10-LAB-N10-013RD") .
    LET (?startTime := "01/06/2012 08:20:00 AM") .
    LET (?endTime := "01/06/2012 12:20:00 PM") .
    ?ebiPoint core:hasPointName ?ebiPointName .
    ?ebiPoint core:forSensor ?sensor .
    ?sensor security:opensSpace ?space .
    BIND(smf:name(?space) AS ?spaceName) .
    ?space core:hasDescription ?spaceDescription .
    ?read security:hasSource ?ebiPointName .
    ?read core:hasDateTime ?dateTime .
    ?read security:hasCardHolderID ?cardHolderId .
    ?read security:hasCardNumber ?cardNumber .
    ?read security:hasCardHolderFirstName ?cardHolderFirstName .
    ?read security:hasCardHolderLastName ?cardHolderLastName .
    ?read security:hasConditionName ?conditionName .
    FILTER (:dateTimeNoZoneISO8601(?dateTime) >=
:dateTimeNoZoneISO8601(?startTime) &&
:dateTimeNoZoneISO8601(?dateTime)
< :dateTimeNoZoneISO8601(?endTime)) }
#Get AccessReportItem for Proximity Card in time range
SELECT ?read ?sensor ?dateTime ?cardHolderFirstName
?cardHolderLastName
?conditionName ?spaceName ?spaceDescription ?cardNumber
WHERE { LET (?cardNumber := 38912) .
    LET (?startTime := "01/06/2012 08:20:00 AM") .
    LET (?endTime := "01/06/2012 12:20:00 PM") .
    ?ebiPoint core:hasPointName ?ebiPointName .
    ?ebiPoint core:forSensor ?sensor .
    ?sensor security:opensSpace ?space .
    BIND(smf:name(?space) AS ?spaceName) .
    ?space core:hasDescription ?spaceDescription .
    ?read security:hasSource ?ebiPointName .
    ?read core:hasDateTime ?dateTime .
    ?read security:hasCardHolderID ?cardHolderId .
    ?read security:hasCardNumber ?cardNumber .
    ?read security:hasCardHolderFirstName ?cardHolderFirstName .
    ?read security:hasCardHolderLastName ?cardHolderLastName .
    ?read security:hasConditionName ?conditionName .
    FILTER (:dateTimeNoZoneISO8601(?dateTime) >=
:dateTimeNoZoneISO8601(?startTime) &&
:dateTimeNoZoneISO8601(?dateTime)
< :dateTimeNoZoneISO8601(?endTime)) }
#Get Camera
SELECT ?logItem ?dateTime ?source ?eventType
WHERE { LET (?eventType := "Object Entered") .
    LET (?source := "cam05") .
    LET (?startTime := "01/06/2012 08:42:01 AM") .
    LET (?endTime := "01/06/2012 08:42:11 AM") .
    ?logItem a security:VideoAnalyticsLogItem .
    ?logItem core:hasDateTime ?dateTime .
    ?logItem security:hasEventType ?eventType .
    ?logItem security:hasSource ?source .
    FILTER (core:dateTimeNoZoneISO8601(?dateTime) >=
core:dateTimeNoZoneISO8601(?startTime) &&
core:dateTimeNoZoneISO8601(?dateTime) <=
core:dateTimeNoZoneISO8601(?endTime)) .}
```

Methods and systems for improving security system operator efficiency are now described with reference to the figures.

Figure 1:
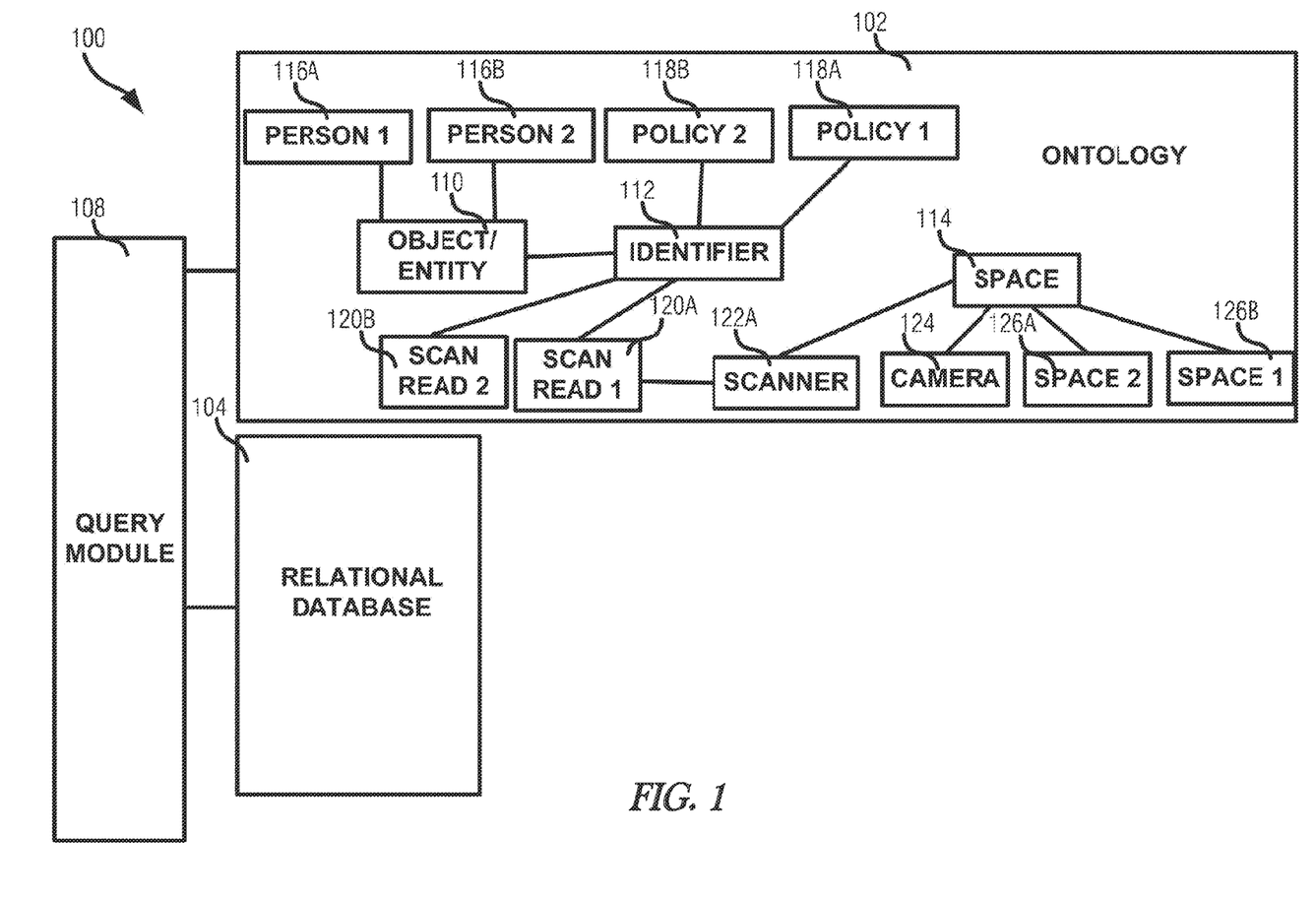
FIG. 1 is a block diagram of an example of a system.

FIG. 1 shows an example of a system 100 including an ontology 102, a relational database 104, and a query module 108. The ontology 102 and the relational database 104 can be accessed and searched by the query module 108.

The ontology 102 can include a variety of interrelated classes and instances. The interrelationships and definitions of the classes and instances can represent a domain of knowledge and can help model the domain and support reasoning within the domain. The ontology 102 can be saved in a memory in a format, such as an RDF format, that is configured to be searched using a query algorithm, such as a SPARQL search algorithm. FIG. 1 shows an example of an ontology 102 configured for use in a security system.

The ontology 102 shown in FIG. 1 includes classes object/entity 110, identifier 112, and space 114 and instances person 1 116A, person 2 116B, policy 1 118A, policy 2 118B, scan read 1 120A, scan read 2 120B, scanner 122A, camera 124A, space 1 126A, and space 2 126B. The lines connecting the objects and instances represent interrelationships between them. For example, the line connecting the instance person 1 116A to the object/entity 110 class can indicate that person 1 116A is an instance of that class that has been created. The line connecting scanner 122A with scan read 1 130A can indicate that the scanner associated with the scanner 122A instance scanned an identifier associated with the identifier 112 class. The line connecting camera 124A to space 114 can indicate that a "space" (e.g., space 1 128A or space 2 126A) defined in spatial information 106 can include a camera instance with a field of view that overlaps or intersects the footprint of the space.

Spatial information and temporal (e.g., time series) information can be stored in the relational database 104 (e.g., a MySQL format). The spatial information in the relational database 104 can include location or coverage area of the camera 124A, the room or space name, boundaries of the room or space name, a door or entryway, or the scanner one must pass to enter or exit the space via an entry/exit point. Scalable Vector Graphics (SVG) can be used to show a vector image for a floor map. An eXtensible Stylesheet Language Transformation (XSLT) can be used to convert a SPARQL eXtensible Markup Language (XML) request, or a portion thereof, to another language. A Cascading Styles Sheets (CSS) language can be used to format and display a result returned from the query.

The temporal information stored in the relational database 104 can include a sequence of time series entries corresponding to scan logs of the scanners in the area under surveillance, or other time series information pertinent to the area under surveillance. The data points can be ordered temporally or include a time stamp or other indicator of the timing of an event associated with the ontology 102. The temporal information can include scan reads 120A-120B that indicate when an identifier 112 associated with an entity/object 110 was scanned by a scanner 122A. The temporal information can include an indication of when the identifier 112 was scanned, where the identifier 112 was scanned, what equipment scanned the identifier 112, the result of the scan (e.g., whether the entity was allowed or denied access based on the scan), or other data related to the scanning event. Other examples of temporal information can include a camera turning on and beginning to record, such as because a motion sensor detected movement, an object was detected by an object recognition detection system associated with a camera, an identifier was rejected by a scanner, or the like.

The relational database 104 is a database that has a collection of tables of data items that are formally described and organized according to a relational model. In the relational model, each table can include a primary column used for identifying a row (e.g., the primary key). Tables can relate by using another key that points to the primary key.

The relational database 104 can include one or more definitions of space 1 128B and space 2 126B, and the location of assets located in space 2 126B, namely camera 124B and scanner 122B. The asset location, area, volume, or the like of the space can be recorded in the relational database. The spatial information can include one or more details regarding the geometry of the field of view of the "camera". The spatial information can include locations of entry and exit points to the spaces defined therein. The entry or exit points can be related to a camera with a field of view that overlaps, at least partially, with the location of the entry or exit points in the ontology 102.

The query module 108 can be configured to receive a query and send commands to one or more processors to perform the query. The query module 108 can receive the results of the query, or the results can be presented to an operator on a display. This configuration can provide information quickly and efficiently to a user. Such a configuration can reduce the amount of knowledge required to be known or retained by the user and the amount of knowledge required to respond to the result of a query submitted or a security policy breach. For example, a user may need to know how to respond to a security threat by viewing cameras on a path to an exit of an area under surveillance. Instead of requiring a user to know all the paths and associated cameras to the exit, the user can submit a query to the system to find out the paths and associated cameras or have the paths or camera images displayed for the operator. In one or more embodiments, the security policies or security responses can be configured to cause the query module 108 to perform one or predefined queries so as to automatically provide the user with one or more camera views, one or more floor plan views detailing the history or future predicted path of a person or asset in the area under surveillance, or other information pertinent to a detected security threat.

In one or more embodiments, the system can be configured to run periodic, random, or pre-programmed queries to determine if a policy (e.g., policy 1 118A or policy 2 118B) has been violated. If the policy has been violated, the system can be configured to run a pre-determined set of one or more queries and provide a user with the results of the queries automatically (e.g., without human interference or interaction beyond pre-programming the queries to be executed). In one or more embodiments, the results of the query can include prompts that a user should adhere to in responding to a detected violation of a policy. Note that automatically, as used herein, means without human intervention.

Figure 2:
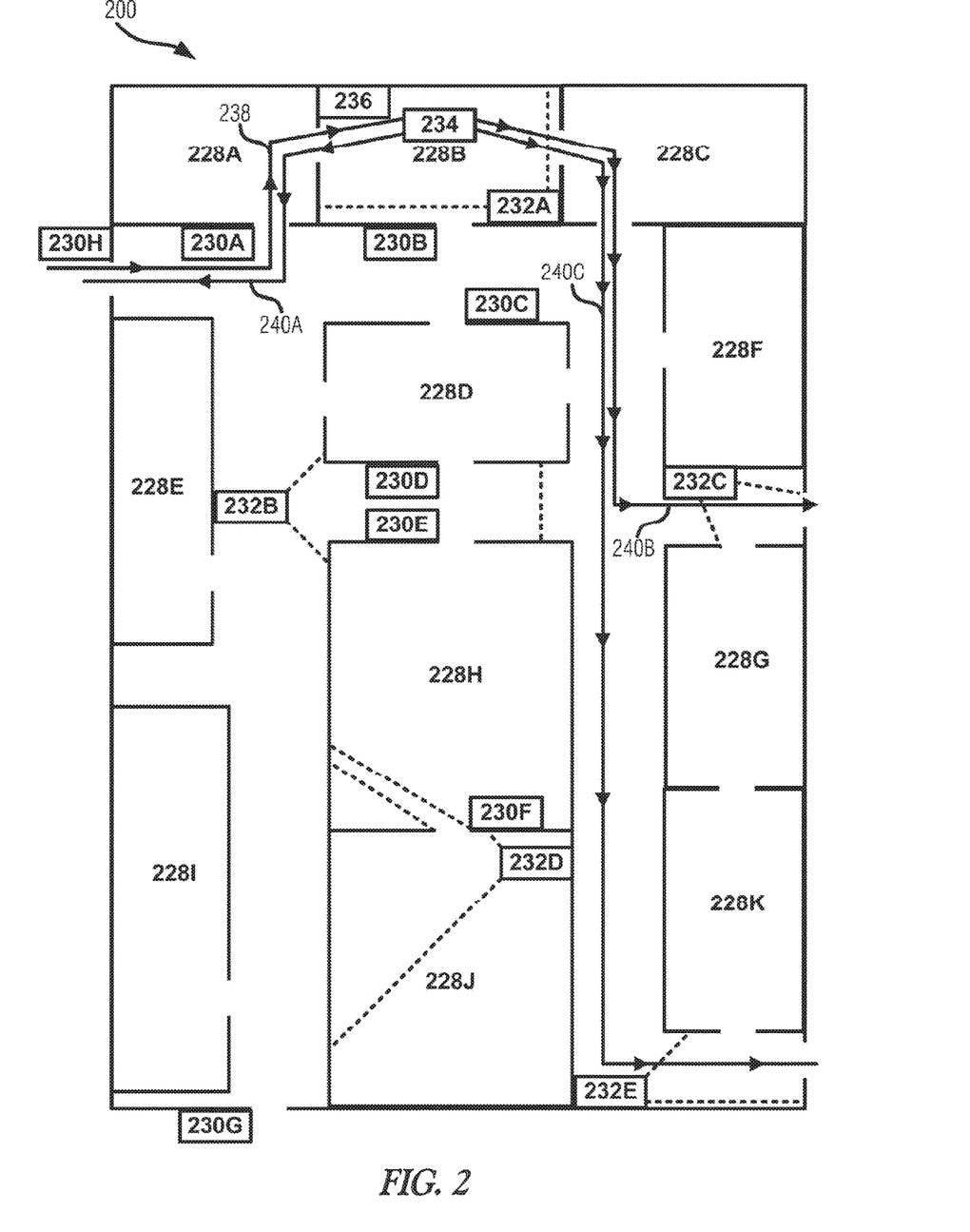
FIG. 2 is a block diagram of an example of a floor plan of an area under surveillance.

FIG. 2 shows an example of a floor plan 200 of an area under surveillance that includes one or more icons overlaid thereon. In the example shown in FIG. 2, the floor plan 200 includes icons indicating the boundaries of spaces 228A, 228B, 228C, 228D, 228E, 228F, 228G, 228H, 228I, 228J, and 228K. The floor plan 200 includes icons representative of scanners 230A, 230B, 230C, 230D, 230E, 230F, 230G, and 230H. The floor plan 200 includes icons representative of cameras 232A, 232B, 232C, 232D, and 232E, identifier 234, and asset 236. The floor plan 200 includes icons indicating a historical path 238 of the identifier 234, and future predicted paths 240A, 240B, and 240C of the identifier 234. The floor plan 200 includes an icon representative camera field of view for each camera 232A-232E (indicated by the dashed lines extending from each camera icon). The floor plan 200 indicates the entry/exit points from each of the spaces 228A-228K.

While the floor plan 200 shows a variety of icons, it should be appreciated that the floor plan 200 can include icons representative of other items or information relevant to the area under surveillance, such as the location of other sensors or other assets or items located in the area under surveillance.

In an example of an asset missing security policy, the query module can be configured to determine if the asset 236 is present in the space 228B, which it is normally supposed to be located. If the asset 236 is determined to be missing, such as through viewing the images from the camera 232A manually, or using object recognition software, or the like, the security system 100 can submit a series of queries (e.g., automatically) to the query module 108. The query module 108 can search the ontology data 102 and the relational database 104 to determine which identifiers 234 the scanners 230A-B have scanned in response to determining the asset 236 is missing. A query configured to determine if other scanners 230 have scanned the identifier 234 in a specified time window (e.g., a time window earlier in time than the time the asset 236 was determined to be missing) can be submitted to the query module 108. A query configured to determine future predicted paths 240A-240C of the identifier 234 can be submitted to the query module 108. If a camera 232 includes a filed of view that intersects with a future predicted path 240A-240C, then the images captured by the camera 232 can be displayed, such as in real time. In the example shown in FIG. 2, cameras 232A, 232C, and 232E, each include a field of view that intersects with a predicted future path 240A, 240B, and 240C, respectively.

Icons shown on the floor plan 200 can be associated with items in the ontology 102. For example, the camera 124, in the ontology 102, and the camera 232A can both represent the camera present in the area under surveillance. The two instances of the can be linked, such as by relating the two instances through a Global Unique Identifier (GUID). In this manner, if an operator searches for the GUID, time series information including the GUID, floor plan 200 data that includes the GUID, or ontology data that includes the GUID can be retrieved (e.g., depending on the context of the search). Similar relations can be made to relate identifiers, scanners, assets, spaces, cameras, entry/exit points, or other instances on the floor map, in the time series data, or in the ontology to each other.

Figure 3:
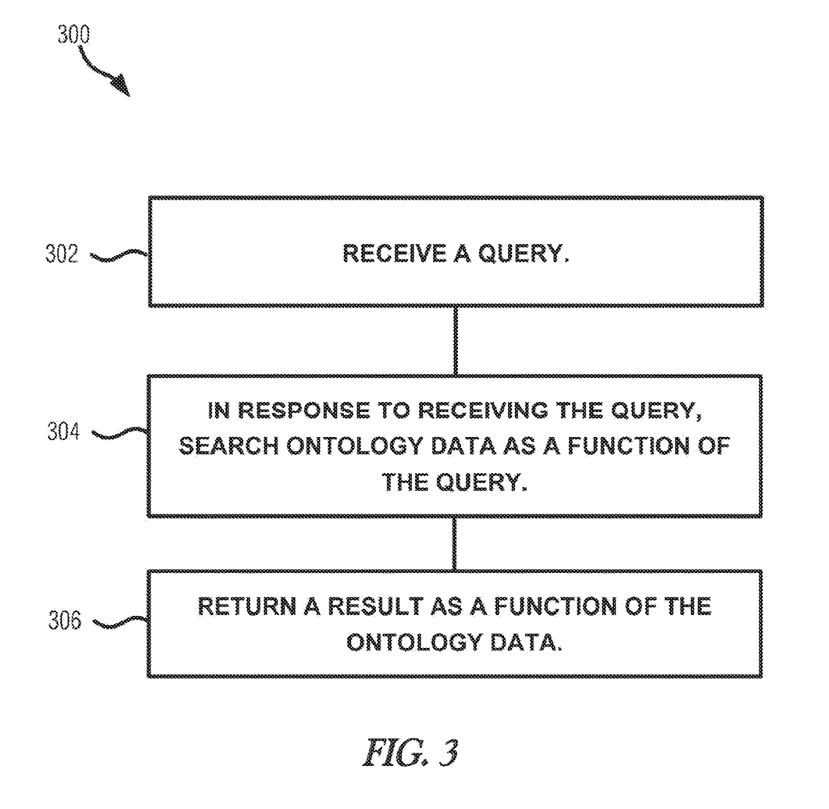
FIG. 3 is a block diagram of an example of a method.

FIG. 3 shows an example of a technique 300 for improving security system operator efficiency. At 302, a query can be received, such as at the query module 108. The query can be a SPARQL query. At 304, in response to receiving the query, ontology data can be searched as a function of the query. The ontology data can define interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied, among other relationships. The ontology data can be stored in an RDF format. At 306, a result can be returned as a function of the ontology data.

The technique 300 can include utilizing a display module to generate a display signal which when provided to a display device causes displaying a floor plan (e.g., floor plan 200) of the area under surveillance. The floor plan can include one or more icons overlaid thereon. The one or more icons can include a location of a camera (e.g., camera 232A-232E), a field of view of the camera, a location of a scanner (e.g., scanner 230A-230H), a location of an identifier, a door, an entrance, an exit, and a path of the person associated with the identifier in the area under surveillance. The path of the person can include a predicted future path of the person and a historical path of the person. The technique 300 can include displaying an image capture of the camera when a filed of view of the camera intersects the future path of the person.

The technique 300 can include determining the room where an asset that went missing is supposed to be, determining one or more scanners that control access to the room, identifying one or more identifiers that were scanned by the one or more scanners in a specified time window, and identifying a list of other scanners that have scanned an identifier in the list of identifiers in another specified time window. The technique 300 can include calculating the predicted future path of the person associated with the identifier. The technique 300 can include displaying the image capture from the camera includes displaying a real time image capture from the camera in response to calculating the predicted future path. In one embodiment, the display signal is configured to show security response steps in accordance with the security policy. The security response steps may intuitively instruct security personnel how to respond to a security violation or threat, and may be listed and overlaid above the floor plan.

Figure 4:
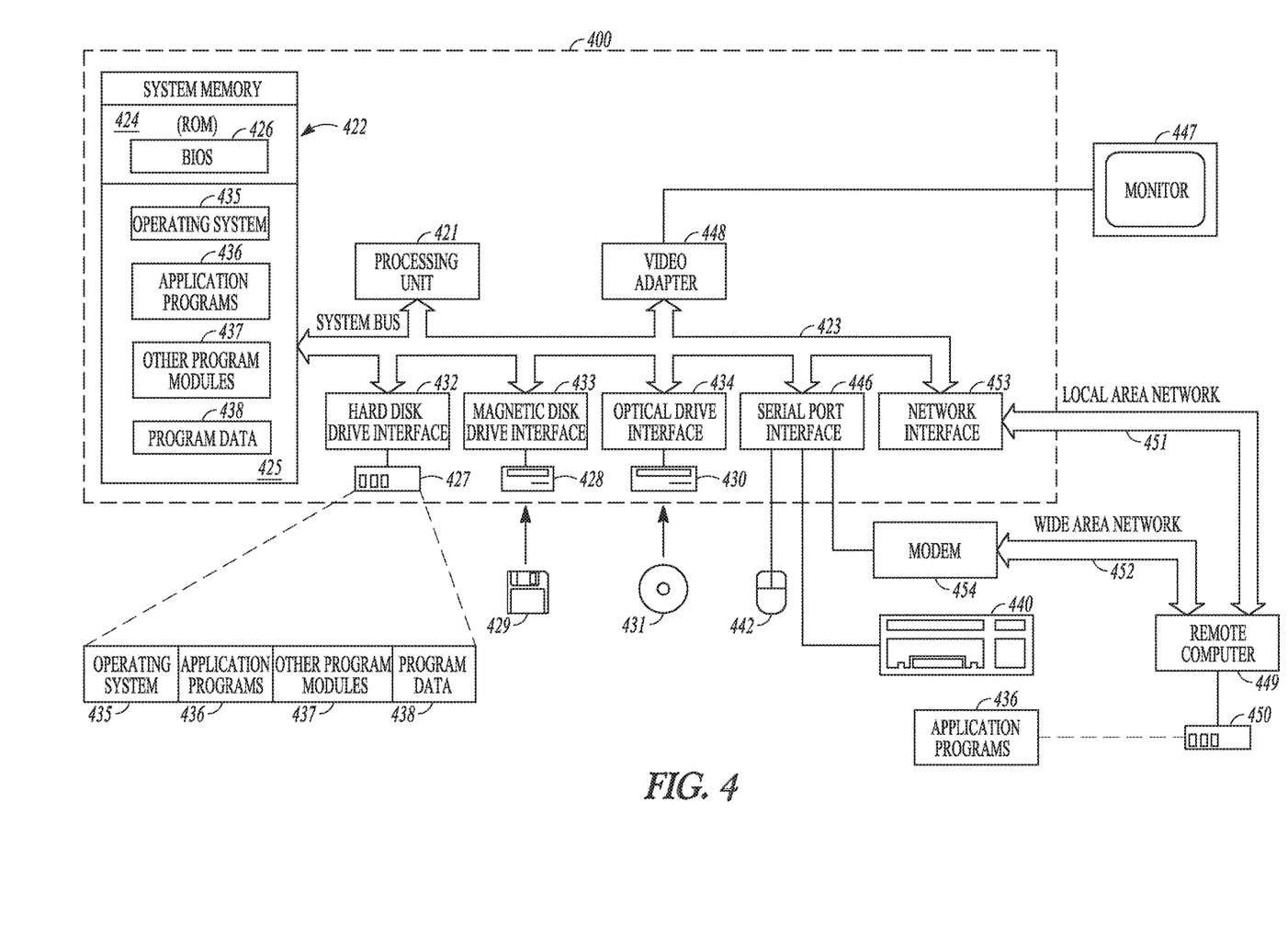
FIG. 4 is a block diagram of an example of a computer system.

FIG. 4 is a block diagram of a computer system to implement methods according to an example embodiment. In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 400 (e.g., a personal computer, workstation, or server), including one or more processing units 421, a system memory 422, and a system bus 423 that operatively couples various system components including the system memory 422 to the processing unit 421. There may be only one or there may be more than one processing unit 421, such that the processor of computer 300 comprises a single central-processing unit (CPU), or a plurality of processing units, commonly referred to as a multiprocessor or parallel-processor environment. In various embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, may be stored in ROM 424. The computer 400 further includes a hard disk drive 427 for reading from and writing to a hard disk, not shown, a magnetic disk drive 428 for reading from or writing to a removable magnetic disk 429, and an optical disk drive 440 for reading from or writing to a removable optical disk 431 such as a CD ROM or other optical media.

The hard disk drive 427, magnetic disk drive 428, and optical disk drive 430 couple with a hard disk drive interface 432, a magnetic disk drive interface 433, and an optical disk drive interface 434, respectively. The drives and their associated computer-readable media provide non volatile storage of computer-readable instructions, data structures, program modules and other data for the computer 400. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein may be resident on any one or number of these computer-readable media.

A user may enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can also be connected to the system bus 423 via an interface, such as a video adapter 448. The monitor 447 can display a graphical user interface for the user. In addition to the monitor 447, computers typically include other peripheral output devices (not shown), such as speakers and printers.

The computer 400 may operate in a networked environment using logical connections to one or more remote computers or servers, such as remote computer 449. These logical connections are achieved by a communication device coupled to or a part of the computer 400; the invention is not limited to a particular type of communications device. The remote computer 449 can be another computer, a server, a router, a network PC, a client, a peer device or other common network node, and typically includes many or all of the elements described above I/0 relative to the computer 400, although only a memory storage device 350 has been illustrated. The logical connections depicted in FIG. 3 include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 is connected to the LAN 451 through a network interface or adapter 453, which is one type of communications device. In some embodiments, when used in a WAN-networking environment, the computer 400 typically includes a modem 454 (another type of communications device) or any other type of communications device, e.g., a wireless transceiver, for establishing communications over the wide-area network 452, such as the internet. The modem 454, which may be internal or external, is connected to the system bus 423 via the serial port interface 446. In a networked environment, program modules depicted relative to the computer 400 can be stored in the remote memory storage device 350 of remote computer, or server 449. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

ADDITIONAL NOTES AND EXAMPLES

In Example 1 a system can include a memory including ontology data stored thereon, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied.

In Example 2, the system of Example 1 can include a query module, executable by a processor, configured to receive a query and search the ontology data and temporal and spatial data associated with the area under surveillance in response to receiving the query.

In Example 3, the system of at least one of Examples 1-2 can include a display module configured generate a display signal to show a floor plan of the area under surveillance, the floor plan including one or more icons overlaid thereon, the one or more icons indicating at least one chosen from the group consisting of a location of the camera, a field of view of the camera, a location of the scanner, a location of the identifier, a door, an entrance, an exit, and a path of the person associated with the identifier in the area under surveillance, or a combination thereof.

In Example 4 the system of example 3, wherein the display signal generated by the display module is further configured to show security response steps in accordance with the security policy, wherein the query result is listed and overlaid above the floor plan.

In Example 5 the path of at least one of Examples 1-3 can be at least one chosen from the group consisting of a predicted future path of the person and a historical path of the person.

In Example 6, the display module signal of at least one of Examples 1-5 can be further configured to display a real time image capture of the camera when a filed of view of the camera intersects with the future path of the person.

In Example 7, ontology data is stored in a Resource Description Framework (RDF) format and wherein the query of at least one of Examples 1-5 can be a SPARQL Protocol and RDF Query Language (SPARQL) query.

In Example 8, the security policy of at least one of Examples 1-7 can include an asset missing security response configured to automatically send a series of queries to the query module.

In Example 9, the series of queries of at least one of Examples 1-8 can be configured to determine the room where an asset that went missing is supposed to be.

In Example 10, the series of queries of at least one of Examples 1-9 can be configured to determine one or more scanners associated with the room.

In Example 11, the series of queries of at least one of Examples 1-10 can be configured to identify one or more identifiers that were scanned by the one or more scanners in a specified time window.

In Example 12, the series of queries of at least one of Examples 1-11 can be configured to identify one or more scanners that have scanned an identifier in the list of identifiers in another specified time window.

In Example 13, the series of queries of at least one of Examples 1-12 can be configured to calculate the predicted future path of the person associated with the identifier.

In Example 14, the series of queries of at least one of Examples 1-13 can be configured to identify one or more cameras with a field of view that intersects the predicted future path.

In Example 15 a method can include receiving, at a query module, a query.

In Example 16, the method of at least one of Examples 1-15 can include, in response to receiving the query, searching ontology data as a function of the query, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied.

In Example 17, the method of at least one of Examples 1-16 can include returning a result as a function of the ontology data.

In Example 18, the method of at least one of Examples 1-17 can include displaying a floor plan of the area under surveillance, the floor plan including one or more icons overlaid thereon, the one or more icons indicating at least one chosen from the group consisting of a location of the camera, a field of view of the camera, a location of the scanner, a location of the identifier, a door, an entrance, an exit, and a path of the person associated with the identifier in the area under surveillance, wherein displaying further includes displaying security response steps intuitively informing how to perform the steps in accordance with the security policy.

In Example 19, the icon indicating the path of the person of at least one of Examples 1-18 can be at least one chosen from the group consisting of a predicted future path of the person and a historical path of the person.

In Example 20, the method of at least one of Examples 1-19 can include displaying an image capture of the camera when a filed of view of the camera intersects the future path of the person.

In Example 21, receiving the query of at least one of Examples 1-20 can include receiving a SPARQL Protocol and RDF Query Language (SPARQL) query.

In Example 22, searching the ontology data of at least one of Examples 1-21 can include searching ontology data stored in a Resource Description Framework (RDF) format.

In Example 23, the method of at least one of Examples 1-22 can include determining a room where an asset that went missing is supposed to be.

In Example 24, the method of at least one of Examples 1-23 can include determining one or more scanners that control access to the room.

In Example 25, the method of at least one of Examples 1-24 can include identifying one or more identifiers that were scanned by the one or more scanners in a specified time window.

In Example 26, the method of at least one of Examples 1-25 can include identifying one or more other scanners that have scanned an identifier in the list of identifiers in another specified time window.

In Example 27, the method of at least one of Examples 1-26 can include calculating the predicted future path of the person associated with the identifier.

In Example 28, displaying the image capture from the camera of at least one of Examples 1-27 can include displaying a real time image capture from the camera in response to calculating the predicted future path.

In Example 29 a computer readable storage device can include instructions stored thereon, the instructions, which when executed by a machine, cause the machine to perform operations including receiving, at a query module, a query.

In Example 30, the storage device of at least one of Examples 1-29 can further include instructions, which when executed by the machine cause the machine to perform operations including, in response to receiving the query, searching ontology data as a function of the query, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied.

In Example 31, the storage device of at least one of Examples 1-30 can further include instructions, which when executed by the machine cause the machine to perform operations including returning a result as a function of the ontology data.

In Example 32, the storage device of at least one of Examples 1-31 can further include instructions, which when executed by the machine cause the machine to perform operations including displaying a floor plan of the area under surveillance, the floor plan including one or more icons overlaid thereon, the one or more icons indicating at least one chosen from the group consisting of a location of the camera, a field of view of the camera, a location of the scanner, a location of the identifier, a door, an entrance, an exit, and a path of the person associated with the identifier in the area under surveillance, wherein displaying further includes displaying security response steps intuitively informing how to perform the steps in accordance with the security policy.

In Example 33, the icon indicating the path of the person of at least one of Examples 1-32 can be at least one chosen from the group consisting of a predicted future path of the person and a historical path of the person.

In Example 34, the storage device of at least one of Examples 1-33 can further include instructions, which when executed by the machine cause the machine to perform operations including displaying an image capture of the camera when a filed of view of the camera intersects the future path of the person.

In Example 35, the instructions for receiving the query of at least one of Examples 1-34 can include instructions for receiving a SPARQL Protocol and RDF Query Language (SPARQL) query.

In Example 36, the instructions for searching the ontology data of at least one of Examples 1-35 can include instructions for searching ontology data stored in a Resource Description Framework (RDF) format.

In Example 37, the storage device of at least one of Examples 1-36 can further include instructions, which when executed by the machine cause the machine to perform operations including determining the room where an asset that went missing is supposed to be.

In Example 38, the storage device of at least one of Examples 1-37 can further include instructions, which when executed by the machine cause the machine to perform operations including determining one or more scanners that control access to the room.

In Example 39, the storage device of at least one of Examples 1-38 can further include instructions, which when executed by the machine cause the machine to perform operations including identifying one or more identifiers that were scanned by the one or more scanners in a specified time window.

In Example 40, the storage device of at least one of Examples 1-39 can further include instructions, which when executed by the machine cause the machine to perform operations including identifying one or more other scanners that have scanned an identifier in the list of identifiers in another specified time window.

In Example 41, the storage device of at least one of Examples 1-40 can further include instructions, which when executed by the machine cause the machine to perform operations including calculating the predicted future path of the person associated with the identifier.

In Example 42, displaying the image capture from the camera of at least one of Examples 1-41 can include displaying a real time image capture from the camera in response to calculating the predicted future path.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A security system for an area under surveillance comprising:
    a first memory including ontology data stored thereon, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied;
    a relational database including temporal data and spatial data stored thereon, the temporal data including time series entries corresponding to scan logs of the scanner including a scan read that indicates a time at which the identifier was scanned, the scanner that scanned the identifier, and whether the person was allowed or denied access based on the scan read, and the spatial data including a location of the camera, a coverage area of the camera, one or more locations of one or more doors to the room, a location of an asset in the room, and a location of the scanner;
    a query module, executable by a processor configured to receive a query and search the ontology data, the temporal data, and the spatial data in response to receiving the query, wherein the query module is configured to run periodic pre-programmed queries to the first memory and the relational database to determine if the security policy has been violated, and wherein the security policy includes an asset-missing security response configured to automatically send a series of queries to the query module, the series of queries configured to search the ontology data, the spatial data, and the temporal data to:
        determine, using the spatial data, the room where an asset that went missing is supposed to be;
        determine, using the spatial data, one or more scanners associated with the room;
        identify, using the temporal data, one or more identifiers in a list of identifiers that were scanned by the one or more scanners in a specified time window;
        identify, using the temporal data, one or more other scanners that have scanned the one or more identifiers in another list of identifiers in another specified time window:
        calculate the predicted future path of one or more persons associated with the one or more identifiers based on the identified one or more scanners and one or more other scanners; and
        identify one or more cameras with a field of view that intersects the predicted future path; and
    a display module configured to generate a display signal to show a floor plan of the area under surveillance, the floor plan including one or more icons overlaid thereon, the one or more icons indicating the location of the camera, the field of view of the camera, the location of the scanner, a location of the identifier, the one or more doors, a predicted future path of the person, a real-time image capture of the camera when a field of view of the camera intersects with the predicted future path of the person, and a historical path of the person, the display signal further shows security response steps in accordance with the security policy.

2. The system of claim 1, the one or more icons further indicating at least one chosen from the group consisting of an entrance and an exit, or a combination thereof.

3. The system of claim 1, wherein the query result is listed and overlaid above the floor plan.

4. The system of claim 1, wherein the ontology data is stored in a Resource Description Framework (RDF) format and wherein the query is a SPARQL Protocol and RDF Query Language (SPARQL) query.

5. A method comprising:
    receiving, at a query module executable by one or more processors, a query;
    in response to receiving the query, searching a first memory with ontology data stored thereon as a function of the query, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied;
    in response to receiving the query, searching a relational database with temporal data and spatial data stored thereon, the temporal data including time series entries corresponding to scan logs of the scanner including a scan read that indicates a time at which the identifier was scanned, the scanner that scanned the identifier, and whether the person was allowed or denied access based on the scan read, and the spatial data including a location of the camera, a coverage area of the camera, one or more locations of one or more doors to the room, a location of an asset in the room, and a location of the scanner;
    returning, by the query module, a result as a function of the ontology data, the temporal data, and the spatial data, the result including a predicted future path of the person, and a historical path of the person, wherein the security policy includes an asset-missing security response configured to automatically send a periodic series of queries to the query module, the periodic series of queries configured to search the ontology data, the spatial data, and the temporal data to perform operations comprising:
        determining the room where an asset that went missing is supposed to be;
        determining one or more scanners that control access to the room;
        identifying one or more identifiers that were scanned by the one or more scanners in a specified time window;

identifying one or more other scanners that have scanned the one or more identifiers in a list of identifiers of the temporal data in another specified time window;

calculating the predicted future path of one or more persons associated with the one or more identifiers based on the one or more scanners; and displaying, by a display module, a floor plan of the area under surveillance, the floor plan including one or more icons overlaid thereon, the one or more icons indicating the location of the camera, the field of view of the camera, the location of the scanner, a location of the identifier, the one or more doors, the predicted future path of the person, a real-time image capture of the camera when a field of view of the camera intersects with the predicted future path of the person, and the historical path of the person, and displaying by the display module, security response steps informing the operator how to perform in accordance with the security policy.

6. The method of claim 5, further comprising displaying a floor plan of the area under surveillance including more icons overlaid thereon, including an entrance and an exit.

7. The method of claim 5, wherein receiving the query includes receiving a SPARQL Protocol and RDF Query Language (SPARQL) query.

8. The method of claim 5, wherein searching the ontology data includes searching ontology data stored in a Resource Description Framework (RDF) format.

9. A computer-readable storage device including instructions stored thereon, the instructions, which when executed by a machine, cause the machine to perform operations comprising:

receiving a query;

in response to receiving a query, searching ontology data as a function of the query, the ontology data stored on a first memory, the ontology data defining interrelationships between a scanner associated with access to a room of an area under surveillance, a camera with a field of view at least partially overlapping a footprint of the room, an identifier configured to be scanned by the scanner and associated with a person, and a security policy including one or more predefined conditions, which when satisfied, indicate when a security threat exists, wherein the security policy includes a response an operator is to perform if the conditions are satisfied;

in response to receiving a query, searching a relational database with temporal data and spatial data stored thereon, the temporal data including time series entries corresponding to scan logs of the scanner including a scan read that indicates a time at which the identifier was scanned, the scanner that scanned the identifier, and whether the person was allowed or denied access based on the scan read, and the spatial data including a location of the camera, a coverage area of the camera, a location of one or more doors to the room, a location of an asset in the room, and a location of the scanner;

returning a result as a function of the ontology data, the temporal data, and the spatial data, the result including a predicted future path of the person, and a historical path of the person, wherein the security policy includes an asset-missing security response configured to automatically submit a periodic series of queries to the relational database, the periodic series of queries configured to search the ontology data, the spatial data, and the temporal data to perform operations of the asset-missing security response comprising:

determining the room where an asset that went missing is supposed to be:

determining one or more scanners that control access to the room;

identifying one or more identifiers that were scanned by the one or more scanners in a specified time window;

identifying one or more other scanners that have scanned the one or more identifiers in a list of identifiers of the temporal data in another specified time window;

calculating the predicted future path of one or more persons associated with the one or more identifiers based on the one or more scanners; and providing, to a display module, display signals that cause the display module to provide a view of a floor plan of the area under surveillance, the floor plan including one or more icons overlaid thereon, the one or more icons indicating the location of the camera, the field of view of the camera, the location of the scanner, a location of the identifier, the one or more doors, the predicted future path of the person, a real-time image capture of the camera when a field of view of the camera intersects with the predicted future path of the person, and the historical path of the person and a view of security response steps informing the operator how to perform in accordance with the security policy.

10. The storage device of claim 9, wherein the instructions further include instructions, which when executed by the machine, cause the machine to perform operations comprising displaying a floor plan of the area under surveillance including more icons overlaid thereon including an entrance and an exit.

11. The storage device of claim 9, wherein the instructions for receiving the query include instruction for receiving a SPARQL Protocol and RDF Query Language (SPARQL) query and the instructions for searching the ontology data include instructions for searching ontology data stored in a Resource Description Framework (RDF) format.

* * * * *